United States Patent [19]

Kelley et al.

[11] 4,448,234
[45] May 15, 1984

[54] METHOD FOR FORMING SAND CORES AND MOLDS

[75] Inventors: Brian D. Kelley; Patrick H. Stewart, both of Danville, Ill.

[73] Assignee: CL Industries, Inc., Danville, Ill.

[21] Appl. No.: 405,415

[22] Filed: Aug. 5, 1982

[51] Int. Cl.$^3$ ............................................. B28B 7/34
[52] U.S. Cl. ................................. 164/16; 106/38.2; 164/526; 164/527; 523/144; 523/145
[58] Field of Search ............... 523/144, 145; 106/38.2; 164/16, 21, 526, 527

[56] References Cited

U.S. PATENT DOCUMENTS

| | | | |
|---|---|---|---|
| 3,008,205 | 11/1961 | Blaies | 264/123 |
| 3,020,609 | 2/1962 | Brown | 22/193 |
| 3,059,297 | 10/1962 | Dunn et al. | 22/193 |
| 3,108,340 | 10/1963 | Peters et al. | 22/193 |
| 3,145,438 | 8/1964 | Kottke et al. | 22/193 |
| 3,184,814 | 5/1965 | Brown | 22/193 |
| 3,525,379 | 8/1970 | Johnson et al. | 164/526 |
| 3,639,654 | 2/1972 | Robins | 260/37 R |
| 3,879,339 | 4/1975 | Richard | 260/38 |

FOREIGN PATENT DOCUMENTS

| | | |
|---|---|---|
| 453160 | 2/1974 | Australia . |
| 1225984 | 3/1971 | United Kingdom . |

*Primary Examiner*—Lorenzo B. Hayes
*Attorney, Agent, or Firm*—Maky, Renner, Otto & Boisselle

[57] ABSTRACT

A hydrogen peroxide system or composition for use in resin polymerization comprises a mixture of a major part of concentrated (70%) hydrogen peroxide admixed with minor amounts of phosphoric acid, a halo-substituted acid, such as hydrochloric acid, fluoboric acid or hydrofluoric acid, and sodium perborate. The peroxide composition is characterized by its storage stability, resistance to detonation, zero flammability, ease of handling and improved catalytic properties in the polymerization of certain resins. This hydrogen peroxide composition is compatible for use with a variety of organic peroxides which have been used for resin condensation polymerization and may be used in conjunction therewith. This hydrogen peroxide composition may be safely mixed with resins and resin prepolymers on the sand prior to use. The peroxide composition, added with other peroxides, and with an acid curable condensation-type resin precursor or prepolymer to sand, formed into cores or molds, and gassed with sulfur dioxide, and optionally purged with air, at a temperature from room temperature to about 300° F. for a time from a fraction of a second to several minutes forms superior sand cores and molds.

7 Claims, No Drawings

METHOD FOR FORMING SAND CORES AND MOLDS

BACKGROUND OF THE INVENTION

1. Field of the Invention

This invention relates to new and useful improvements in hydrogen peroxide/acid compositions for use with resin condensation polymerization.

2. Description of the Prior Art

In the foundry industry, sand is coated with resin binders and formed into molds and cores for the production of precision castings. A wide variety of techniques has been developed for the manufacture of sand cores and molds. These involve the hot box technique for mold and core formation; the shell method; the "No-Bake", and the cold-box technique.

In the hot box and shell methods, sand molds and cores are formed by heating a mixture of sand with a thermosetting resin at a temperature of about 300°–600° F. in contact with patterns which produce the desired shape for the mold or core. The resin is polymerized and a core or mold is formed. Procedures of this type are described in Dunn et al. U.S. Pat. Nos. 3,059,297 and Brown et al. 3,020,609.

A particular disadvantage of the hot box and shell methods is the necessity for heating the pattern boxes to 300°–600° F. to polymerize and cure the resin binder. This involves considerable expense and is generally a high cost technique.

The cold box techniques for core and mold formation involve the use of sand mixed or coated with resins which may be cured at room temperature by acid or base catalysis. Acid or base catalysts have been used in liquid, solid or gaseous form. Typical cold box processes are shown in Blaies U.S. Pat. Nos. 3,008,205; Dunn et al. U.S. Pat. No. 3,059,297; Peters et al U.S. Pat. No. 3,108,340; Kottke et al U.S. Pat. No. 3,145,438; Brown et al. U.S. Pat. No. 3,184,814; Robins U.S. Pat. No. 3,639,654; Australian Pat. No. 453,160 and British Pat. No. 1,225,984. Many of these processes involve the use of sulfur-containing acid catalyst such as benzene sulfonic acid, toluene sulfonic acid and the like.

A few years ago, a process was developed for room temperature polymerization of condensation resins in which an acid-curing agent is generated in situ in the resin or on a sand-resin mix. It had previously been suggested in U.S. Pat. No. 3,145,438 to inject $SO_3$ in a form of a gas into a mixture of sand and resin to cure the resin at room temperature. It was found, however, that this process causes an instantaneous curing of the resin in the region subjected to treatment by $SO_3$ which impedes the diffusion of this gas to other parts of the resin, particularly the central parts of the mixture.

Subsequently, a method was developed which avoided this difficulty. In Richard U.S. Pat. No. 3,879,339, it is disclosed that sand may be coated with a suitable oxidizing agent, such as an organic peroxide, and coated with the resin to be used in binding the sand into the form of a core or mold. The sand-resin mixture is then formed into suitable shape and treated with gaseous $SO_2$. The $SO_2$ is oxidized, in situ, to $SO_3$ and converted to sulfur-containing acid by water present in the mixture. The sulfur-containing acid which is generated in situ causes a rapid and uniform polymerization of the resin at room temperature. This process has proved successful commercially and is applicable to phenolic resins, furan resins, and urea-formaldehyde resins, as well as mixtures and copolymers thereof.

In the cold box method of Richard U.S. Pat. No. 3,879,339, there are a large variety of peroxides disclosed which may be added to sand along with resins which are used in forming sand cores or molds. This composition is subsequently formed into shape and treated with gaseous $SO_2$. The peroxides which are disclosed in the Richard Patent are mostly quite expensive and, in many cases, are difficult to handle and to ship or transport. Organic peroxides require special approval for transportation in interstate commerce. Organic peroxides are often highly flammable or present other fire hazards. Organic peroxides also are often shock sensitive and may explode or detonate under certain conditions. As a result, many organic peroxides can not be used in the Richard process because of economic and safety considerations.

An unpublished, very recent, improvement of the Richard process utilizes a hydrogen peroxide composition which comprises a mixture of a major part of concentrated (70%) hydrogen peroxide admixed with minor amounts of phosphoric acid, a halo-substituted acid, such as hydrochloric acid, fluoboric acid or hydrofluoric acid, and sodium perborate. The peroxide composition is characterized by its storage stability, resistance to detonation, zero flammability, ease of handling and improved catalytic properties in the polymerization of certain resins.

SUMMARY OF THE INVENTION

One of the objects of this invention is provide a new and improved storage stable, easily transportable, nondetonating hydrogen peroxide/acid composition to be used in conjunction with other organic peroxides for use in the polymerization of the resin by gassing with $SO_2$.

Another object of this invention is to provide an improved hydrogen peroxide catalyst composition comprising concentrated hydrogen peroxide admixed with minor amounts of phosphoric acid, a halo-substituted acid and sodium perborate to be used in conjunction with a condensation-type resin containing an organic peroxide as a stable mixture for making sand cores and molds.

Other objects of this invention will become apparent from time to time throughout the specification and claims as hereinafter related.

The above objectives are attained as described below. A hydrogen peroxide system or composition for use in resin polymerization comprises a mixture of a major part of concentrated (70%) hydrogen peroxide admixed with minor amounts of phosphoric acid, a halo-substituted acid, such as hydrochloric acid, fluoboric acid or hydrofluoric acid, and sodium perborate.

The peroxide composition is characterized by its storage stability, resistance to detonation, zero flammability, ease of handling and improved catalytic properties in the polymerization of certain resins. This hydrogen peroxide composition is compatible for use with a variety of organic peroxides which have been used for resin condensation polymerization and may be used in conjunction therewith. In addition, this hydrogen peroxide composition may be safely mixed with resins and resin prepolymers on the sand and stored prior to use.

The peroxide composition may be used with an acid curable condensation-type resin precursor or prepolymer that contains other peroxides and added to sand, formed into cores or molds, and gassed with sulfur dioxide, and optionally purged with air, at a temperature from room temperature to about 300° F. for a time from a fraction of a second to several minutes forms superior sand cores and molds.

DESCRIPTION OF THE PREFERRED EMBODIMENTS

This invention is directed to an improved peroxide composition which is particularly useful in the process of Richard U.S. Pat. No. 3,879,339. The peroxide composition consists of a solution or mixture of concentrated hydrogen peroxide, phosphoric acid, a halo-substituted acid, such as hydrochloric acid, fluoboric acid or hydrofluoric acid, and sodium perborate, to be use in conjunction with other organic peroxides, hydroperoxides and/or hydroxy-hydroperoxides. The hydrogen peroxide is preferably at least 70% strength and is present in the composition in the amount of at least 80%. The composition is especially stable and is very effective in polymerization of condensation-type resins or resin percursors by gassing with sulfur dioxide.

PREPARATION OF CATALYST AND STABILITY TESTING

Example I

A peroxide composition (PEROXIDE COMPOSITION I) was prepared having the following composition:

| | |
|---|---|
| 87.0% | 70% hydrogen peroxide |
| 3.0% | 85% phosphoric acid |
| 3.0% | 48-50% hydrofluoric acid |
| 7.0% | sodium perborate tetrahydrate |

This blend is made by diluting 70%-hydrogen peroxide with hydrofluoric acid, phosphoric acid and sodium perborate tetrahydrate and mixing thoroughly. By diluting the hydrogen peroxide in this manner, the hydrogen peroxide level is reduced without increasing the amount of water by the same amount as would be required if only water were used and the mixture is more highly stabilized. The phospates and borates in the mixture have a stabilizing effect on hydrogen peroxide.

A second peroxide composition (PEROXIDE COMPOSITION II) was prepared having the following composition:

| | |
|---|---|
| 87.0% | 70% hydrogen peroxide |
| 3.0% | 85% phosphoric acid |
| 3.0% | 48% fluoboric acid |
| 7.0% | sodium perborate tetrahydrate |

This blend is made by diluting 70%-hydrogen peroxide with fluoboric acid, phosphoric acid and sodium perborate tetrahydrate and mixing thoroughly. By diluting the hydrogen peroxide in this manner, the hydrogen peroxide level is reduced without increasing the amount of water by the same amount as would be required if only water were used and the mixture is more highly stabilized. The phospates and borates in the mixture have a stabilizing effect on hydrogen peroxide.

Both acids and bases are needed in this dilution to achieve a stable pH. Sodium perborate tetrahydrate is used because it has good solubility, the borate has a stabilizing effect and adds active oxygen to the system. Sodium perborate tetrahydrate has a theoretical active oxygen of 10.4%.

The percent hydrogen peroxide, including that present in the sodium perborate tetrahydrate is theoretically 62.45%, giving a theoretical active oxygen of 29.39%.

A third peroxide composition (PEROXIDE COMPOSITION III) was prepared having the following composition:

| | |
|---|---|
| 87.0% | 70% hydrogen peroxide |
| 3.0% | 85% phosphoric acid |
| 3.0% | 36.5-38% hydrochloric acid |
| 7.0% | sodium perborate tetrahydrate |

This blend is made by diluting 70%-hydrogen peroxide with hydrochloric acid, phosphoric acid and sodium perborate tetrahydrate and mixing thoroughly. By diluting the hydrogen peroxide in this manner, the hydrogen peroxide level is reduced without increasing the amount of water by the same amount as would be required if only water were used and the mixture is more highly stabilized. The phospates and borates in the mixture have a stabilizing effect on hydrogen peroxide.

Both acids and bases are needed in this dilution to achieve a stable pH. Sodium perborate tetrahydrate is used because it has good solubility, the borate has a stabilizing effect and adds active oxygen to the system. Sodium perborate tetrahydrate has a theoretical active oxygen of 10.4%.

The percent hydrogen peroxide, including that present in the sodium perborate tetrahydrate is theoretically 62.45%, giving a theoretical active oxygen of 29.39%.

All three blends, PEROXIDE COMPOSITIONS I, II and III, have active oxygens from 29.0 to 29.2. This lower active oxygen is due to lower than theoretical active oxygens in the raw materials.

The halo-substituted, acid, i.e. hydrofluoric acid, acts as a pH adjuster. Fluoboric acid (48%) and hydrochloric acid (36.5-38%) can also be used in place of hydrofluoric acid.

The raw materials used in these formulations are as follows:

A. Hydrogen peroxide—various grades of 70% hydrogen peroxide can be used. The higher the stabilization of the 70% hydrogen peroxide, the better the stability of the peroxide blend. The stability of the blend is determined by holding a predetermined weight of the material at 100° C. and collecting the gas evolved over water. The volume of the gas is measured at one-hour intervals. When two consecutive readings deviate no more than 20%, their average is taken. When Peroxide Composition I uses dilution grade 70% hydrogen peroxide it gives 4.2-5.6% loss/15 hours at 100° C. depending on the company from which it was obtained. When Peroxide Composition I uses cosmetic grade 70% hydrogen peroxide, which is more stabilized, it gives a 3.3% loss/15 hours at 100° C. The choice of whether to use dilution grade or cosmetic grade will also be affected by cost and availability. B. 85% phosphoric acid—food grade is preferred due to the low levels of impurities.

C. Hydrofluoric acid—48 to 50% reagent grade hydrofluoric acid is preferred due to the low levels of impurities.

D. Hydrochloric acid—36.5-38% reagent grade hydrochloric acid is preferred due to low levels of impurities.

E. Fluoboric acid—48% reagent grade fluoboric acid is preferred due to low levels of impurities.

F. Sodium perborate tetrahydrate—the salt sold commercially is acceptable.

SAFETY TESTING OF CATALYST COMPOSITIONS

Example II

PEROXIDE COMPOSITIONS I, II AND III were tested on various materials to compare with 50% hydrogen peroxide. The comparison was done on wool, wood, rubber (truck tire), carboard, newspaper, and PVC. These tests were done at elevated temperatures, viz. 140°-280° F. on wool and 130°-140° F. on pallet wood, tire rubber, cardboard, newspaper and PVC, to enhance scorching, charring, or combustion. These PEROXIDE COMPOSITIONS were found to be equivalent, if not safer than 50% hydrogen peroxide in all of the tests which were run. The high levels of phosphate and borate have a combusition retarding action. These PEROXIDE COMPOSITIONS also did not smoke, scorch, or char leather at 90° F., 140° F., and 196° F., cotton at 90° F., 140° F., 180° F., and 50/50 polyester/cotton blend at 90° F., 140° F., and 186° F.

These PEROXIDE COMPOSITIONS were also subjected to a modified trauzyl block test. The test was conducted according to the OPPSD procedure; the volume expansion was 9.8 mls.

These PEROXIDE COMPOSITIONS were also given an Impact test. The materials failed consistently to explode or ignite in the Bureau of Explosives' impact apparatus under a drop weight of 10"—both when tested alone and when absorbed on filter paper.

These materials were given the Liquid Oxidizer Test (173.151 appendix C). A box was built with the dimensions given in the test: 2'×2'×2' box of natural wood with sides not more than ¼" thick, with a ¼" diameter hole at the horizontal center of each of the vertical sides 4" from the bottom edge, and a 1-inch diameter hole in the center top of the box. This box was packed tightly with wood excelsior containing less than 5% water and the top was secured in place. Two liters of PEROXIDE COMPOSITION I were poured into the box and the box was tipped in different directions to distribute the material uniformly. Aftering standing for 2 hours, no ignition or smoking resulted. No ignition occurred after 24 hours. Ignition of the excelsior after 2 hours identifies the material as a liquid oxidizer.

USE OF ORGANIC PEROXIDES IN RESIN POLYMERIZATION

The PEROXIDE COMPOSITIONS described above are superior in stability and resistance to detonation which makes them easier to transport, store and use. These PEROXIDE COMPOSITIONS give satisfactory results in polymerizing various condensation-type resins at substantially lower peroxide concentrations than has been necessary with the various oganic peroxides which have been used for that purpose in the SO$_2$ gassing process. The following EXAMPLES were carried out using furfurylalcohol-formaldehyde resin prepolymers but similar results are obtained when the PEROXIDE COMPOSITIONS are used with phenol-formaldehyde, urea-formaldehyde, phenol-urea-formaldehyde resins, modified phenol-formaldehyde, urea-formaldehyde, phenol-urea-formaldehyde resins, and acid-curable furfurylalcohol resins and resin prepolymers.

EXAMPLE III

A foundry-grade (Wedron 5040) sand was mixed with 1.25% wt. (based on the sand) of a furfurylalcohol-formaldehyde resin prepolymer and mulled for three minutes. Next, 7% wt. (based on the resin weight) of the PEROXIDE COMPOSITION I of EXAMPLE I was added and the mixture mulled for an additional three minutes. The sand/resin/peroxide mix was then rammed or blown into a mold and gassed with SO$_2$ for about 2.0 seconds at a sand temperature of 78° F., followed by an air purge. Gassing times of about 0.5 seconds to about 5 minutes and temperatures from room temperature or ambient to about 300° F. can be used.

The product obtained after 20 seconds, as described above, is capable of being handled immediately. This product has an immediate core hardness of 74 and tensile strength of 99 psi. Core strengths of 161 psi after 5 min., 192 psi. after one hour, and 201 psi. after 24 hours are satisfactory. Core hardness is 75 after 5 min., 74 after one hour, and 80 after 24 hours.

EXAMPLE IV

A foundry-grade (Wedron 5040) sand was mixed with 1.25% wt. (based on the sand) of a furfurylalcohol-formaldehyde resin prepolymer and mulled for three minutes. Next, 12% wt. (based on the resin weight) of the PEROXIDE COMPOSITION I of EXAMPLE I was added and the mixture mulled for an additional three minutes. The sand/resin/peroxide mix was then rammed or blown into a mold and gassed with SO$_2$ for about 2.0 seconds at a sand temperature of 78° F., followed by an air purge. Gassing times of about 0.5 seconds to about 5 minutes and temperatures from room temperature to about 300° F. can be used.

The product obtained after 20 seconds, as described above, is substantially stronger than the product of EXAMPLE III. This product has an immediate core hardness of 77 and tensile strength of 149 psi. Core strengths of 156 psi after 5 min., 186 psi. after one hour, and 196 psi. after 24 hours are satisfactory. Core hardness is 75 after 5 min., 87 after one hour, and 78 after 24 hours.

EXAMPLE V

A foundry-grade (Wedron 5040) sand was mixed with 1.25% wt. (based on the sand) of a furfurylalcohol-formaldehyde resin prepolymer and mulled for three minutes. Next, 17% wt. (based on the resin weight) of the PEROXIDE COMPOSITION I of EXAMPLE I was added and the mixture mulled for an additional three minutes. The sand/resin/peroxide mix was then rammed or blown into a mold and gassed with SO$_2$ for about 2.0 seconds at a sand temperature of 78° F., followed by an air purge. Gassing times of about 0.5 seconds to about 5 minutes and temperatures from room temperature to about 300° F. can be used.

The product obtained after 20 seconds, as described above, is substantially stronger than the product of EXAMPLE III. This product has an immediate core hardness of 80 and tensile strength of 172 psi. Core strengths of 215 psi after 5 min., 202 psi. after one hour, and 196 psi. after 24 hours are satisfactory. Core hardness is 85 after 5 min., 85 after one hour, and 81 after 24 hours.

EXAMPLE VI

A foundry-grade (Wedron 5040) sand was mixed with 1.25% wt. (based on the sand) of a furfurylalcohol-formaldehyde resin prepolymer and mulled for three minutes. Next, 22% wt. (based on the resin weight) of the PEROXIDE COMPOSITION I of EXAMPLE I was added and the mixture mulled for an additional three minutes. The sand/resin/peroxide mix was then rammed or blown into a mold and gassed with SO₂ for about 2.0 seconds at a sand temperature of 78° F., followed by an air purge. Gassing times of about 0.5 seconds to about 5 minutes and temperatures from room temperature to about 300° F. can be used.

The product obtained after 20 seconds, as described above, is substantially stronger than the product of EXAMPLE III. This product has an immediate core hardness of 81 and tensile strength of 172 psi. Core strengths of 204 psi after 5 min., 172 psi. after one hour, and 245 psi. after 24 hours are satisfactory. Core hardness is 86 after 5 min., 81 after one hour, and 76 after 24 hours.

USE OF PEROXIDE COMPOSITIONS IN CONJUNCTION WITH ORGANIC PEROXIDES

It has been found that PEROXIDE COMPOSITIONS I AND II are compatible for use with various organic peroxides, hydroperoxides, and/or hydroxyhydroperoxides which have been used in the SO₂ gassing process for polymerization of condensation-type resins.

One organic peroxide composition which can be used in conjunction with these PEROXIDE COMPOSITIONS is a composition or blend which is described more fully below as PEROXIDE COMPOSITION IV.

In the commercial manufacture of p-diisopropylbenzene dihydroperoxide, an organic peroxide composition is obtained as a byproduct referred to herein as crude diisopropylbenzene hydroperoxide and consisting essentially of diisopropylbenzene dihydroperoxide; diisopropylbenzene monohydroperoxide; a-hydroxy, a-hydroperoxy diisopropyl benzene; a-hydroxy, diisopropyl benzene; and p-diisopropyl benzene.

One particular crude diisopropylbenzene hydroperoxide composition which has been reported to be useful as a catalyst component has approximately the following composition:

| | |
|---|---|
| 55.9% | diisopropylbenzene monohydroperoxide |
| 11.0% | diisopropylbenzene dihydroperoxide |
| 10.0% | diisopropylbenzene |
| 0.44% | benzene |
| 1.5% | water |
| 21% | mixture of 1-isopropyl-4-isopropanol benzene, diisopropyl benzene, 1-isopropanol-4-isopropylbenzene hydroperoxide, and p-benzene dipropenoic acid disodium salt. |

The stated percentages, as used herein, are by weight based on total composition unless otherwise stated.

Stable peroxide blends for catalyst application are prepared using organic solvents which are cosolvents for diisopropylbenzene monohydroperoxide, diisopropylbenzene dihydroperoxide and hydrogen peroxide. Solvents which are particularly useful are methanol, cyclohexanone, glycol ethers, furfuryl alcohol, diisopropyl benzene (in compositions not containing hydrogen peroxide), dioxane and phenol. Such solvents will dissolve mixtures of diisopropylbenzene monohydroperoxide and diisopropylbenzene dihydroperoxide, such as crude diisopropylbenzene hydroperoxide and are cosolvents for hydrogen peroxide.

PEROXIDE COMPOSITION IV is a catalyst blend of the following proportions:

| | |
|---|---|
| 68% | crude diisopropylbenzene hydroperoxide |
| 21% | cyclohexanone |
| 11% | 70% hydrogen peroxide |

The amount of solvent in this blend is somewhat critical. If the proportion of cyclohexanone is decreased below about 19% some of the ingredients begin to drop out of solution.

EXAMPLE VII

A foundry-grade (Wedron 5040) sand was mixed with 1.25% wt. (based on the sand) of a furfurylalcohol-formaldehyde resin prepolymer and mulled for three minutes. Next, 18% wt. (based on the resin weight) of the PEROXIDE COMPOSITION I of EXAMPLE I was added together with 20% wt. (based on the resin weight) of PEROXIDE COMPOSITION IV and the mixture mulled for an additional three minutes. The sand-resin-peroxide mix was then rammed or blown into a mold and gassed with SO₂ for about 2.0 seconds at a sand temperature of 79° F., followed by an air purge. Gassing times of about 0.5 seconds to about 5 minutes and temperatures from room temperature or ambient to about 300° F. can be used. These components are separately applied.

The product obtained after 20 seconds, as described above, is capable of being handled immediately. This product has an immediate core hardness of 83 and tensile strength of 157 psi. Core strengths of 292 psi after 5 min., 336 psi. after two hours, and 337 psi. after 24 hours are satisfactory. Core hardness is 90 after 5 min., 93 after two hours, and 90 after 24 hours.

EXAMPLE VIII

A foundry-grade (Wedron 5040) sand was mixed with 1.25% wt. (based on the sand) of a furfurylalcohol-formaldehyde resin prepolymer and mulled for three minutes. Next, 18% wt. (based on the resin weight) of the PEROXIDE COMPOSITION III of EXAMPLE I was added together with 20% wt. (based on the resin weight) of PEROXIDE COMPOSITION IV and the mixture mulled for an additional three minutes. The sand-resin-peroxide mix was then rammed or blown into a mold and gassed with SO₂ for about 2.0 seconds at a sand temperature of 79° F., followed by an air purge. Gassing times of about 0.5 seconds to about 5 minutes and temperatures from room temperature or ambient to about 300° F. can be used.

The product obtained after 20 seconds, as described above, is capable of being handled immediately. This product has an immediate core hardness of 81 and tensile strength of 110 psi. Core strengths of 161 psi after 5 min., 133 psi. after two hours, and 118 psi. after 24 hours are satisfactory. Core hardness is 82 after 5 min., 63 after two hours, and 69 after 24 hours.

EXAMPLE IX

A foundry-grade (Wedron 5040) sand was mixed with 1.25% wt. (based on the sand) of a furfurylalcohol-formaldehyde resin prepolymer and mulled for three minutes. Next, 18% wt. (based on the resin weight) of the PEROXIDE COMPOSITION II of EXAMPLE I was added together with 20% wt. (based on the resin weight) of PEROXIDE COMPOSITION IV and the mixture mulled for an additional three minutes. The sand-resin-peroxide mix was then rammed or blown into a mold and gassed with $SO_2$ for about 2.0 seconds at a sand temperature of 79° F., followed by an air purge. Gassing times of about 0.5 seconds to about 5 minutes and temperatures from room temperature or ambient to about 300° F. can be used. The PEROXIDE COMPOSITION and the PEROXIDE COMPOSITION IV are not compatible and can not be mixed and stored. The components must be applied separately to the sand in the proportions indicated.

The product obtained after 20 seconds, as described above, is capable of being handled immediately. This product has a core hardness of 85 and tensile strength of 158 psi. Core strengths of 302 psi after 5 min., 369 psi. after one hour, and 322 psi. after 24 hours are satisfactory. Core hardness is 91 after 5 min., 94 after one hour, and 89 after 24 hours.

EXAMPLE X

Two control runs were made comparing the use of PEROXIDE COMPOSITION IV with (1) 50%-hydrogen peroxide and (2) 70%-hydrogen peroxide with the PEROXIDE COMPOSITION IV-PEROXIDE COMPOSITION mixtures reported above.

A foundry-grade (Wedron 5040) sand was mixed with 1.25% wt. (based on the sand) of a furfurylalcohol-formaldehyde resin prepolymer and mulled for three minutes. Next, 18% wt. (based on the resin weight) of 50%-hydrogen peroxide, in one run, and 70%-hydrogen peroxide, in the other run, was added separately to te sand with 20% wt. (based on the resin weight) of PEROXIDE COMPOSITION IV and the sand-resin-peroxide mixture mulled for an additional three minutes. In each of the control runs, the sand-resin-peroxide mix was rammed or blown into a mold and gassed with $SO_2$ for about 2.0 seconds at a sand temperature of 79° F., followed by an air purge. Gassing times of about 0.5 seconds to about 5 minutes and temperatures from room temperature or ambient to about 300° F. can be used.

In each case, the product obtained after 20 seconds, as described above, is capable of being handled immediately.

In the run using 50%-hydrogen peroxide, this product has an immediate core hardness of 68 and tensile strength of 117 psi. Core strengths of 126 psi after 5 min., 123 psi. after two hours, and 130 psi. after 24 hours are somewhat low, but satisfactory. Core hardness is 65 after 5 min., 63 after two hours, and 61 after 24 hours.

In the run using 70%-hydrogen peroxide, this product has a core hardness of 70 and tensile strength of 122 psi. Core strengths of 153 psi after 5 min., 134 psi. after two hours, and 144 psi. after 24 hours are somewhat low, but satisfactory. Core hardness is 70 after 5 min., 69 after two hours, and 61 after 24 hours.

EXAMPLE XI

Two runs were made using PEROXIDE COMPOSITION I in cnjunction with (MEKP) methyl ethyl ketone peroxide (which is commonly used in the $SO_2$ gassing process for condensation polymerization).

A foundry-grade (Wedron 5040) sand was mixed with 1.25% wt. (based on the sand) of a furfurylalcohol-formaldehyde resin prepolymer and mulled for three minutes. Next, 20% wt. (based on the resin weight) of MEKP, in one run, and 25% MEKP, in the other run, was added separately with 20% wt. (based on the resin weight) of PEROXIDE COMPOSITION I, in the one run, and 15% of PEROXIDE COMPOSITION I, in the other run, and the mixture mulled for an additional three minutes. In each of the runs, the sand-resin-peroxide mix was rammed or blown into a mold and gassed with $SO_2$ for about 2.0 seconds at a sand temperature of 80° F., followed by an air purge. Gassing times of about 0.5 seconds to about 5 minutes and temperatures from room temperature or ambient to about 300° F. can be used.

In each case, the product obtained after 20 seconds, as described above, is capable of being handled immediately.

In the run using 20:20 MEKP: PEROXIDE COMPOSITION I, this product has an immediate core hardness of 71 and tensile strength of 169 psi. Core strengths of 179 psi after 5 min., 176 psi. after two hours, and 236 psi. after 24 hours are somewhat low, but satisfactory. Core hardness is 74 after 5 min., 74 after two hours, and 80 after 24 hours.

In the run using 25:15 MEKP: PEROXIDE COMPOSITION I, this product has an immediate core hardness of 71 and tensile strength of 176 psi. Core strengths of 201 psi after 5 min., 205 psi. after two hours, and 243 psi. after 24 hours are somewhat low, but satisfactory. Core hardness is 74 after 5 min., 79 after two hours, and 77 after 24 hours.

EVALUATION

PEROXIDE COMPOSITION I is excellent when used in conjunction with other peroxides, hydroperoxides, and/or hydroxy-hydroperoxides. When PEROXIDE COMPOSITION is used with other peroxides, the poor core surface that is common with straight hydrogen peroxide blends is eliminated. Peroxides tried were PEROXIDE COMPOSITION IV, methyl ethyl ketone peroxide (MEKP), cumene hydroperoxide, paramenthane hydroperoxide, crude diisopropyl benzene hydroperoxide, crude triisopropyl benzene hydroperoxide, and crude diisopropyl benzene hydroperoxide/cumene hydroperoxide.

The most extensive work was done with a combination of PEROXIDE COMPOSITION IV and PEROXIDE COMPOSITION I. The PEROXIDE COMPOSITION IV/PEROXIDE COMPOSITION I system has shown certain advantages over commercial methyl ethyl ketone peroxide (MEKP) formulations. While core strengths with the PEROXIDE COMPOSITION IV/PEROXIDE COMPOSITION system are generally about 25% lower than with MEKP 20 seconds after gassing, the cores have adequate strength.

The PEROXIDE COMPOSITION IV/PEROXIDE COMPOSITION I cores have significantly less residual $SO_2$ odor compared to commercial methyl ethyl ketone peroxide, and the total amount of peroxide (based on resin) is 7% less than when commercial MEKP is used. The ratios of PEROXIDE COMPOSITION IV/PEROXIDE COMPOSITION I can be varied to the conditions.

When PEROXIDE COMPOSITION I is used in conjunction with MEKP, 20/20 and 25/15: MEKP/PEROXIDE COMPOSITION I give cores of adequate strength with 5% less total peroxide and 20 to 25% less MEKP present.

When PEROXIDE COMPOSITION I was compared to 70% and 50% hydrogen peroxide, all used in conjunction with PEROXIDE COMPOSITION IV, it was found that the core strength was better using PEROXIDE COMPOSITION I at 20 seconds, 5 minutes, 2 hours, and 24 hours. The core hardness of PEROXIDE COMPOSITION I is also significantly better at 2 hours and 24 hours.

The PEROXIDE COMPOSITION IV/PEROXIDE COMPOSITIONS I-III has a number of advantages as do mixtures of PEROXIDE COMPOSITIONS I, II and III with other oxidizers. There is less total oxidizer in the system than with MEKP. Since PEROXIDE COMPOSITIONS I-III are not organic, there are less organics in the system than are present when MEKP is used. There is less post-cure core odor or residual SO$_2$ odor than is present when MEKP or PEROXIDE COMPOSITION IV are used alone. Furthermore PEROXIDE COMPOSITIONS I-III are not combustible, are lower in cost than MEKP, and are a non-detonatable peroxides.

USE OF PEROXIDE COMPOSITIONS IN CONJUNCTION WITH A RESIN/PEROXIDE BLEND

It has been found that an organic peroxide composition obtained as a byproduct in the commercial manufacture of p-diisopropylbenzene dihydroperoxide and referred to herein as crude diisopropylbenzene hydroperoxide is soluble in and forms stable mixtures with, resin precursors or prepolymers such as furfuryl alcohol and polyfurfuryl alcohol, and resin prepolymers including furfuryl alcohol and furfuryl alcohol resin precursors, and furfuryl alcohol-formaldehyde resin, phenolic and urea-formaldehyde modified furfuryl alcohol-formaldehyde resin, phenolic modified furfuryl alcohol-formaldehyde resin, urea-formaldehyde modified furfuryl alcohol-formaldehyde resin, and phenolic resin prepolymers, in the range from about 10 to 40% wt. to form storage stable compositions. This crude diisopropylbenzene hydroperoxide consists essentially of diisopropylbenzene dihydroperoxide; diisopropylbenzene monohydroperoxide; a-hydroxy, a-hydroperoxy diisopropyl benzene; a-hydroxy, diisopropyl benzene; and p-diisopropyl benzene.

One particular crude diisopropylbenzene hydroperoxide composition which has been reported to be useful as a catalyst component has approximately the following composition:

| | |
|---|---|
| 55.9% | diisopropylbenzene monohydroperoxide |
| 11.0% | diisopropylbenzene dihydroperoxide |
| 10.0% | diisopropylbenzene |
| 0.44% | benzene |
| 1.5% | water |
| 21% | mixture of 1-isopropyl-4-isopropanol benzene, diisopropyl benzene, 1-isopropanol-4-isopropylbenzene hydroperoxide, and p-benzene dipropenoic acid disodium salt. |

Although the level of this crude diisopropylbenzene hydroperoxide can be varied in the resins, it has been found that 16.7% is the optimum level to be used in a furfuryl alcohol-formaldehyde resin prepolymer giving a peroxide-resin composition (RESIN COMPOSITION I) as follows:
  83.3% furfuryl alcohol-formaldehyde resin prepolymer
  16.7 crude diisopropylbenzene hydroperoxide
It should also be noted that other organic peroxides, such as cumene hydroperoxide, paramenthane hydroperoxide, etc., can be blended in the resins for use, depending on the requirements of stability, odor, etc.

EXAMPLE XII

A foundry-grade (Wedron 5040) sand was mixed with 1.5% wt. (based on the sand) of RESIN COMPOSITION I and mulled for three minutes. Next, 15% wt. (based on the resin weight) of the PEROXIDE COMPOSITION I of EXAMPLE I was added and the mixture was mulled for an additional three minutes. The sand-resin-peroxide mix was then rammed or blown into a mold and gassed with SO$_2$ for about 2.0 seconds at a sand temperature of 80° F., followed by an air purge. Gassing times of about 0.5 seconds to about 5 minutes and temperatures from room temperature or ambient to about 300° F. can be used.

The product obtained after 20 seconds, as described above, is capable of being handled immediately. This product has an immedate core hardness of 82 and tensile strength of 117 psi. Core strengths of 217 psi after 5 min., 298 psi. after two hours, and 289 psi. after 24 hours are satisfactory. Core hardness is 88 after 5 min., 82 after two hours, and 87 after 24 hours.

CRUDE TRIISOPROPYLBENZENE HYDROPEROXIDE

Crude triisopropylbenzene hydroperoxide is an organic peroxide composition obtained by oxidizing crude triisopropylbenzene. Crude triisopropylbenzene is produced by the reaction of one mole benzene with three moles propene in the presence of an aluminum chloride catalyst. The crude triisopropyl benzene is a mixture which is predominantly 1, 3, 5 triisopropylbenzene and minor amounts of 1, 2, 4 triisopropylbenzene, meta- and para-diisopropylbenzene, cumene, and a trace of 1, 2, 4, 5 tetraisopropylbenzene.

It has been found that crude triisopropylbenzene hydroperoxide is soluble in and forms stable mixtures with, resin precursors or prepolymers such as furfuryl alcohol and polyfurfuryl alcohol, and resin prepolymers including furfuryl alcohol and furfuryl alcohol resin precursors, and furfuryl alcohol-formaldehyde resin, phenolic and urea-formaldehyde modified furfuryl alcohol-formaldehyde resin, phenolic modified furfuryl alcohol-formaldehyde resin, urea-formaldehyde modified furfuryl alcohol-formaldehyde resin, and phenolic resin prepolymers, in the range from about 10 to 40% wt. to form storage stable compositions.

This crude triisopropylbenzene hydroperoxide consists essentially of 1, 3, 5-triisopropylbenzene monohydroperoxide and 1, 3, 5-triisopropylbenzene dihydroperoxide; with minor amounts of 1, 3, 5 triisopropylbenzene trihydroperoxide; the mono-, di-, and trihydroperoxides of 1, 2, 4 triisopropylbenzene; m-diisopropylbenzene dihydroperoxide; m-diisopropylbenzene monohydroperoxide; p-diisopropylbenzene dihydroperoxide; p-diisopropylbenzene monohydroperoxide; some cumene hydroperoxide; and minor amounts of various other by-products associated with this oxidation.

One particular crude triisopropylbenzene hydroperoxide composition which has been reported to be useful as a catalyst component was from an oxidation of the following composition:

| | |
|---|---|
| 68.2% | 1,3,5 triisopropylbenzene |
| 3.9% | 1,2,4 triisopropylbenzene |

| | |
|---|---|
| 10.0% | p-diisopropylbenzene |
| 16.4% | m-diisopropylbenzene |
| 1.5% | cumene |
| trace | 1,2,4,5 tetraisopropylbenzene |

The stated percentages are by weight based on total composition unless otherwise stated. The oxidation was carried out to an active oxygen content of 6.4% and then distilled to an active oxygen content of 7.0%.

Although the level of this crude triisopropylbenzene hydroperoxide can be varied in the resins, it has been found that 16.7% is the optimum level to be used in a furfuryl alcohol-formaldehyde resin prepolymer giving a peroxide-resin composition (RESIN COMPOSITION II) as follows:

83.3% furfuryl alcohol-formaldehyde resin prepolymer
16.7 crude triisopropylbenzene hydroperoxide

EXAMPLE XIII

A foundry-grade (Wedron 5040) sand was mixed with 1.5% wt. (based on the sand) of RESIN COMPOSITION II and mulled for three minutes. Next, 15% wt. (based on the resin weight) of the PEROXIDE COMPOSITION I was added and the mixture was mulled for an additional three minutes. The sand-resin-peroxide mix was then rammed or blown into a mold and gassed with SO$_2$ for about 2.0 seconds at a sand temperature of 80° F., followed by an air purge. Gassing times of about 0.5 seconds to about 5 minutes and temperatures from room temperature or ambient to about 300° F. can be used.

The product obtained after 20 seconds, as described above, is capable of being handled immediately. This product has an immedate core hardness of 72 and tensile strength of 153 psi. Core strengths of 215 psi after 5 min., 211 psi. after one hour, and 263 psi. after 24 hours are satisfactory. Core hardness is 81 after 5 min., 80 after one hour, and 84 after 24 hours.

While this invention has been described fully and completely with special emphasis on several preferred embodiments, it should be understood that, within the scope of the appended claims, the invention can be practiced otherwise than as specifically described herein.

We claim:

1. In a method of forming sand cores or molds which comprises
   mixing a major amount of sand with a minor amount of an organic peroxide, hydroperoxide or hydroxyhydroperoxide, and an acid-curable, condensation-type resin or a condensation-type resin precursor or a condensation-type resin prepolymer,
   forming said mixture into the shape of a core or mold, and
   gassing said formed mixture with sulfur dioxide for a period of a few seconds to several minutes at a temperature from room temperature or ambient to about 300° F. to cause resin polymerization; the improvement comprising adding to said mixture, prior to the forming step, a hydrogen peroxide composition comprising a major amount of concentrated hydrogen peroxide and minor amounts of phosphoric acid, a halogen-containing acid, and a water-soluble perborate salt.

2. A method according to claim 1 in which said resin or resin precursors or prepolymers consist essentially of a furfuryl alcohol-formaldehyde resin, a phenol-formaldehyde resin, urea-formaldehyde resin, phenol-urea-formaldehyde resins, modified phenol-formaldehyde, urea-formaldehyde, phenol-urea-formaldehyde resins, furfuryl alcohol or polyfurfuryl alcohol resin, furfuryl alcohol resin precursors, phenolic and urea-formaldehyde modified furfuryl alcohol-formaldehyde resin, phenolic modified furfuryl alcohol-formaldehyde resin, urea-formaldehyde modified furfuryl alcohol-formaldehyde resin, or phenolic resin prepolymers.

3. A method according to claim 1 in which said organic peroxide is a ketone peroxide, cumene hydroperoxide, paramenthane hydroperoxide, crude triisopropylbenzene hydroperoxide or crude diisopropylbenzene hydroperoxide.

4. A method according to claim 1, 2 or 3 in which said organic peroxide, hydroperoxide or hydroxyhydroperoxide is premixed with said resin or resin precursor or prepolymer.

5. A method according to claim 1, 2 or 3 in which said organic peroxide, hydroperoxide or hydroxyhydroperoxide is premixed with said resin or resin precursor or prepolymer in the proportion of about 10 to 40% wt. based on the resin.

6. A method according to claim 1, 2 or 3 in which said organic peroxide, hydroperoxide or hydroxyhydroperoxide is premixed with said resin or resin precursor or prepolymer in the proportion of about 10 to 40% wt. based on the resin and hydrogen peroxide is separately added to the sand.

7. A method according to claim 1, 2 or 3 in which said hydrogen peroxide composition comprises

| | | |
|---|---|---|
| | 87.0% | 70% hydrogen peroxide |
| | 3.0% | 85% phosphoric acid |
| | 3.0% | 48–50% hydrofluoric acid |
| | 7.0% | sodium perborate tetrahydrate |
| or | | |
| | 87.0% | 70% hydrogen peroxide |
| | 3.0% | 85% phosphoric acid |
| | 3.0% | 48% fluoboric acid |
| | 7.0% | sodium perborate tetrahydrate |
| or | | |
| | 87.0% | 70% hydrogen peroxide |
| | 3.0% | 85% phosphoric acid |
| | 3.0% | 36.5–38% hydrochloric acid |
| | 7.0% | sodium perborate tetrahydrate. |

* * * * *